United States Patent
Olofsson

(10) Patent No.: US 7,678,285 B2
(45) Date of Patent: Mar. 16, 2010

(54) APPARATUS AND METHOD FOR SEPARATION OF WATER FROM AN EMULSION OR MIXTURE OF WATER AND OIL

(76) Inventor: Claes Olofsson, Brándtorpsvágen 5, S-392 36 Kalmar (SE)

( * ) Notice: Subject to any disclaimer, the term of this patent is extended or adjusted under 35 U.S.C. 154(b) by 6 days.

(21) Appl. No.: 12/065,835

(22) PCT Filed: Sep. 18, 2006

(86) PCT No.: PCT/SE2006/001057

§ 371 (c)(1),
(2), (4) Date: Mar. 5, 2008

(87) PCT Pub. No.: WO2007/035152

PCT Pub. Date: Mar. 29, 2007

(65) Prior Publication Data

US 2008/0272069 A1    Nov. 6, 2008

(30) Foreign Application Priority Data

Sep. 19, 2005    (SE)    ................ 0502055
Jan. 16, 2006    (SE)    ................ 0600099

(51) Int. Cl.
   *B01D 17/032*    (2006.01)
(52) U.S. Cl. ............. 210/800; 210/536; 210/540
(58) Field of Classification Search .......... 210/741, 210/744, 800, 801, 104, 137, 532.1, 533, 210/536, 538, 540
   See application file for complete search history.

(56) References Cited

U.S. PATENT DOCUMENTS 1,984,003 A * 12/1934 Welsh ................ 210/708
4,014,791 A * 3/1977 Tuttle ................ 210/540
4,132,238 A    1/1979 Clark
4,252,649 A * 2/1981 Favret, Jr. ............. 210/800
4,308,136 A * 12/1981 Warne, Jr. ............. 210/536
4,802,978 A * 2/1989 Schmit et al. ........... 210/540
4,804,471 A * 2/1989 Velisavljevic ........... 210/540
4,855,065 A * 8/1989 Keeter et al. ............ 210/804

(Continued)

FOREIGN PATENT DOCUMENTS

AT    400 560    1/1996

(Continued)

*Primary Examiner*—Christopher Upton
(74) *Attorney, Agent, or Firm*—Dickstein Shapiro LLP

(57) ABSTRACT

The invention refers to an oil recover unit (1) having at least one container (5) for retrieval of a mixture/emulsion of mainly water (3) and oil (4) for separation of the water (3) from the oil (4). The retrieval is provided via at least one inflow (6), located at lower part (24) of the container (5), where the mixture/emulsion (2) is soaked up and under pressure pressed upwards into the container (5) by at least one pump (8) at the same time as the oil (4), which has a lower density than the water (3), floats upwards in the form of oil particles (16) in the surrounding water (3) and creates an oil bed (17) on the water (3), whereby on at least one place, where the oil particles (16) move upwards, somewhere under the oil bed (17), at least one collecting place (9) is connected in direct or indirect connection to at least one discharge canal (11), through which the surrounding water (3) in the mixture/emulsion (2), possibly containing a small quantity of oil (4), is dischargeable from the container (5), as discharged water (13), via at least one existing lower discharge (14), placed at the lower part (24) of the container (5) at the same time as the oil bed (17) is dischargeable at the upper part (12) of the container via at least one existing upper discharge (15).

4 Claims, 2 Drawing Sheets

U.S. PATENT DOCUMENTS

| | | | | |
|---|---|---|---|---|
| 5,059,312 A | * | 10/1991 | Galletti | 210/540 |
| 5,073,266 A | * | 12/1991 | Ball, IV | 210/540 |
| 5,340,477 A | * | 8/1994 | Simon | 210/540 |
| 5,378,376 A | * | 1/1995 | Zenner | 210/800 |
| 6,033,577 A | * | 3/2000 | Braband et al. | 210/741 |
| 6,881,329 B2 | * | 4/2005 | Amado et al. | 210/540 |
| 2004/0108266 A1 | * | 6/2004 | Agnew | 210/532.1 |
| 2005/0035037 A1 | * | 2/2005 | Lindsey et al. | 210/538 |

FOREIGN PATENT DOCUMENTS

| | | |
|---|---|---|
| DE | 91 04 255 | 7/1991 |
| DE | 295 20 958 | 7/1996 |
| FR | 2 560 903 | 9/1985 |
| JP | 2000-262807 | 9/2000 |

* cited by examiner

APPARATUS AND METHOD FOR SEPARATION OF WATER FROM AN EMULSION OR MIXTURE OF WATER AND OIL

The present invention refers to an oil recover unit having a container for the retrieving of a mixture/emulsion of water and oil for the separation of the water from the oil.

BACKGROUND OF THE INVENTION

On the market existing constructions of this type consist of oil recover units, which are used for the clearing of oil and the separation of water from the oil for e.g. in oil spills in watercourses near beaches, from the surface of water, inside tankers and other places. The oil recover units of today are large, expensive, with complicated structure, ungainly to manage, it therefore takes time to get these in place to get the work done immediately. Large oil recover units do not reach to work over all places, since the environment does not allow for their use or because they take too much space and are too heavy. This is the reason why much of the cleaning up work to separate the oil is done by hand with pitchforks, spades, rakes etc. Previous methods retrieve the oil/water mixture in a container, whereupon one must wait 10-20 hours for the oil to rise to the surface so that the oil then can be removed. This takes time and requires large space and has no continuity in the process. Document U.S. Pat. No. 4,855,065 shows a very large, expensive and complicated structure for the separation of oil from water with mobile parts. Through many stages and by centrifugalizing the water/oil mixture the water can be separated. Document U.S. Pat. No. 2,917,178 shows another large, ungainly and expensive machine using a complicated process, where the water/oil mixture pours through different rooms and sections in stages, transported from above downwards, the oil being separated from the water and finally filtered through a filter. In document U.S. Pat. No. 1,984,003 the separation of water from oil takes also place in different stages through to a number of different rooms and sections. This installation shows mainly the same disadvantages as those in the other two documents show. Furthermore the above installations also require high maintenance, which is costly.

SUMMARY OF THE INVENTION

The object of the present invention is to solve the problems mentioned above by creating an inexpensive, easily manageable, requiring no maintenance and a well working oil recover unit with few parts and without filter, which functions with a continuous process to soak up and separate water from oil without chemicals in a mixture/emulsion of mainly water and oil from e.g. an oil spill in a watercourse. The characterizing features of the invention are mentioned in the following claims.

Thanks to the invention an oil recover unit has been provided, which is small, light, user friendly, inexpensive and effective with few parts and no filter which has to be changed, said recover unit can readily be employed in small places, even in environmentally sensitive areas and with immediate effect continuity, without delay, which is capable of starting cleaning up oil without chemicals from water, before environmental damage occur. The oil recover unit can be used at all kinds of oil spills and because of its small size and low weight it is most suitable for smaller oil spills and in acute situations and can easily be transported by one person.

BRIEF DESCRIPTION OF THE DRAWINGS

The invention is described in more detail below with the help of a preferred embodiment example referring to the drawings enclosed, in which.

DETAILED DESCRIPTION OF THE PREFERRED EMBODIMENT

Figure 1:
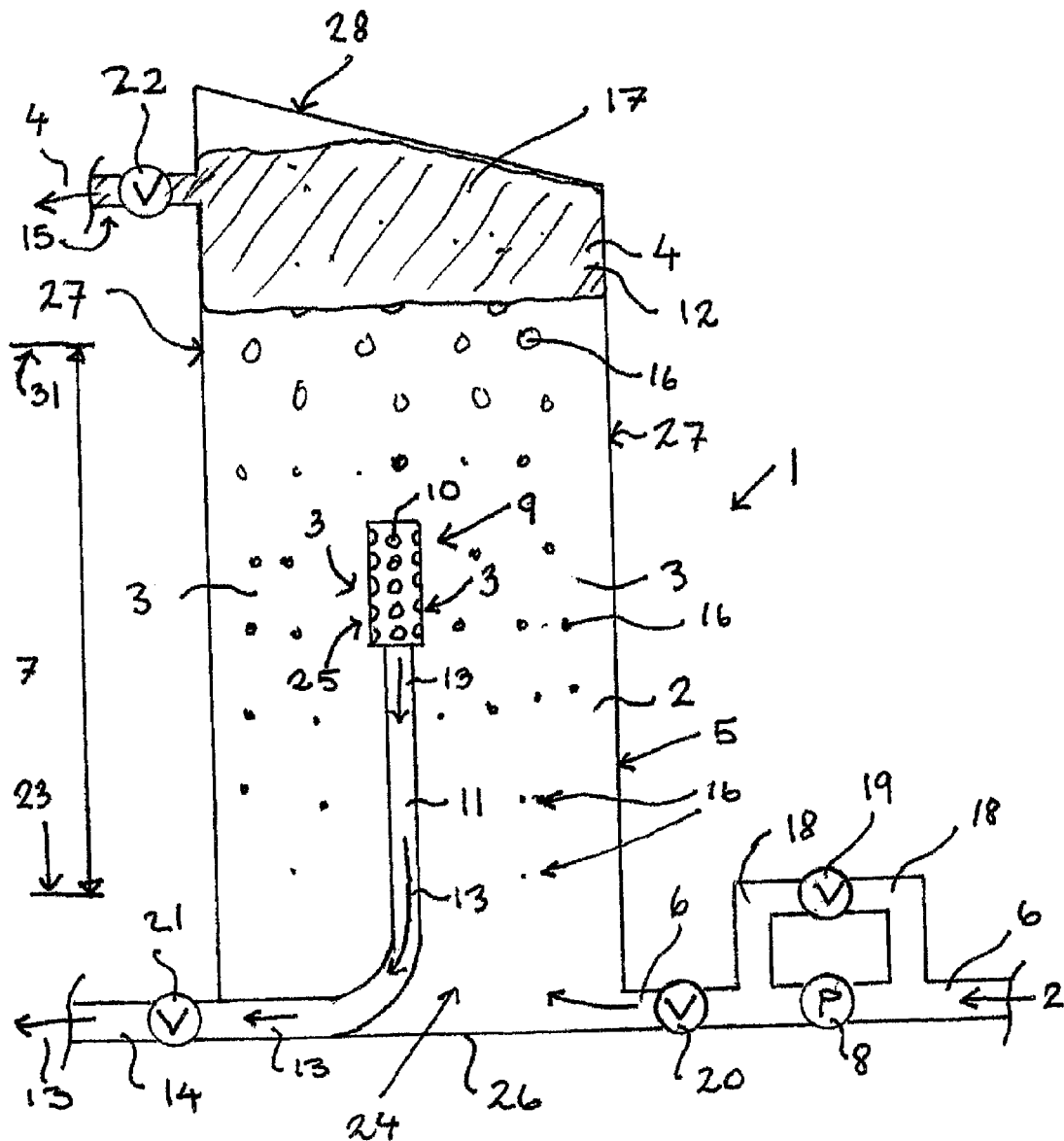
FIG. 1 shows a schematic view in a vertical section through an oil recover unit according to the invention and FIG. 2 shows a perspective view an oil recover unit according to the invention.
Figure 2:
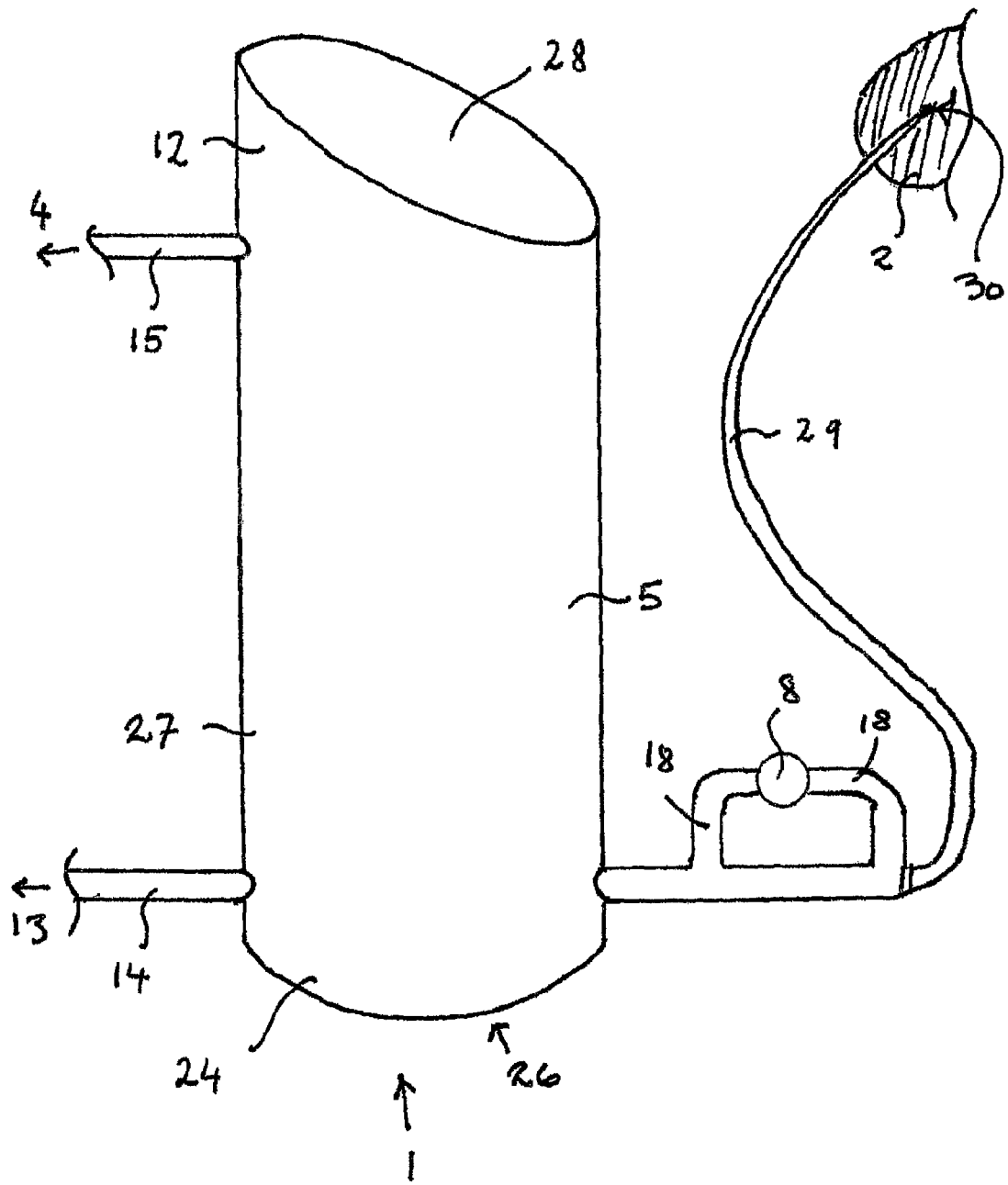

The figures show an oil recover unit 1 having a container 5 for retrieval of a mixture/emulsion 2 of water 3 and oil 4, where the separation of water from oil takes place. The retrieval is arranged via an inflow 6 located at the lower part 24 of the container 5. The mixture/emulsion 2 soaks up into a hose 29 connected to the inflow 6, so that the mixture/emulsion 2 then can be pushed up under pressure into the container 5 by help of a pump 8. The oil 4, which has a lower density than water 3, rises upwards in the form of oil particles 16 in the surrounding water and creates an oil bed 17 on the water surface 3, which is continuously lifted up by the water. In one place where the oil particles 16 move upwards, somewhere under the bed of oil, a collecting place 9 is arranged in form of a number of holes 10 in the upper part of a discharging canal 11 or on a flexible upwards directed drainage pipe 25, through which the surrounding water 3 in the mixture/emulsion 2 is conducted away from the container 5, as tapped out water 13 through the discharging canal 11 and out through a lower discharge 14 in the lower part 24 of the container 5. The oil bed 17 is discharged at the upper part 12 of the container 5 via an existing upper discharge 15 and where it is taken care of. The pump 8 is according to the invention connected to the inflow 6. There is a "bypass"-conduit 18 provided passing the pump 8, which can be connected in order to in a varying degree open and close the same on demand by a first valve 19 to feed the mixture/emulsion 2 totally or partly back again to the pump 8, to a place upstream the pump 8. Hereby a pressure relief is obtained, which slows down the inflow, so that the turbulence in the mixture/emulsion is reduced. However, the turbulence in this part is so large in the mixture/emulsion 2, that the collecting place 9 shall be arranged above this area, where the oil particles have been so large and the turbulence so small, that they move upwards so that the water effectively can run out. The inflow 6, the lower discharge 14, the upper drainage or discharge 15 each is provided with a valve 20, 21 and 22 respectively, which can be opened and closed in a varying degree on demand. The locations of the collecting places 9 can according to the invention be arranged at the lowest level 23 in the container 5, which is located, where the oil particles start moving upwards, and at the highest place at an upper level 31 at a distance 7 from each other, right under the oil bed 17, where the oil particles have not yet been assimilated with the same. Within the distance 7 between the lower and upper level, a removal upwards and downwards may take place by the influence of power at the discharge canal 11 or on the flexible, upwards directed drainage pipe 25, which is connected to the drainage canal 11, preferably in the middle viewed from above the container 5. The holes 10 are now arranged on the sides of the drainage pipes 25 or the upper part of the discharge canal 11, whereby a desired level can be achieved by an adjustment according to the position of the holes 10 in height, so that an optimal separation of the water from the oil can take place at every point of time adapted after what type, quality and viscosity the oil has and what density, depending on the percentage of salt, the water has.

According to a preferred embodiment example of the invention the container is made of stainless steel which shows no pores, in order to avoid that the oil particles getting stuck on the inner surfaces of the container. The container 5 has a bottom 26 with an upwards directed cylindrical wall 27 and a roof 28, which hermetically encloses the retrieved mixture/emulsion 2. The height of the container 5 is at least twice as long as its width. The roof 28 has a leaning part towards the horizontal plane, whereby the oil bed 17 touches the roof 28, when it reaches the upper discharge 22, whereby possible particles of water and particles of air in the oil bed will be pressed out of the same and flatten it, whereby the oil more easily can be discharged. The highest point of the roof 28 is now directed in the same direction, as the upper discharge 22, which is arranged in the wall mainly at the same height as the lowest point of the roof. The oil recover unit 1 can be produced small and light, so that it can be transported quickly and easily and also on a small two wheeled carriage with a handle, and the container will in this way have space for less than 100 liters with an attached hose 29 having a length of approximately 25 meters, which is connected to the inflow 6. The hose 29 has a non return valve 30 in order to avoid a flow back again out of the tube of the retrieved mixture/emulsion. To make the mixture/emulsion 2 more liquid flowing, it can be heated on a place under the oil bed, preferably at the inflow 6 with a surrounding heated surface before it reaches the pump 8 and fills the container 5.

According to the invention the retrieval of the mixture/emulsion and the separation of the water from the oil with the oil recover unit 1 takes place, according to a process, in different stages. In a first step (1) a second valve 20 is opened at the inflow 6 and a fourth valve 23 at the upper discharge 15, at the same time as the first and a third valve 21 at the lower discharge 14 are closed. The pump 8 is started, whereby the hose 29 soaks up parts of the mixture/emulsion 2, which later under pressure is pushed up until the container 5 is filled up to the upper discharge 15. Then in a second step (2), the pump 8 is shut off during a preferred space of time until a preferred thickness of the oil bed 17 has been created. In a third step (3), the discharged water starts to fill the discharge canal 11, whereby the third valve 21 is opened for discharging the discharged water via the lower discharged 14 at the same time as the pump starts again to keep the oil bed continuously in level with the upper discharge 15, where the oil is discharged, so that the oil bed 17 is continuously filled with new oil particles. After this, in a fourth step (4), the first valve is opened 19 on demand to such a degree, that an adequate decrease of turbulence is achieved. In a fifth step (5), if the percentage of oil is higher than the desired percentage of oil in the discharged water, this is fed in return to the inflow 6, whereby during the third to fifth steps (3-5) all valves are adjusted at will, so that the oil recover unit 1 continuously and optimally can soak up the mixture/emulsion and optimally be able to separate the water from oil. The process of the retrieval of the mixture/emulsion 2 and separation of water from oil is according to the invention continuously maneuvered by a computer/processor, that via sensors, which are arranged somewhere in the oil recover unit and which at any moment sense and maneuver different functions in the process after desired, predetermined programmed targets in the computer/processor, such as e.g. when, how much and for how long time the valves shall be open or closed and the level of height of the collecting place 9 and the activities of the pump and the heating.

The invention claimed is:

1. An oil recover unit (1) comprising:
   at least one container (5) for retrieval of a mixture/emulsion of mainly water (3) and oil (4) and for separation of the water (3) from the oil (4),
   at least one inflow (6), located at a lower part (24) of the container (5), configured so that the mixture/emulsion (2) can be soaked up and under pressure be pressed upwards into the container (5) using at least one pump (8) at the same time as the oil (4), floats upwards in the form of oil particles (16) in the surrounding water (3) and creates an oil bed (17) on the water (3),
   whereby on at least one place, where the oil particles (16) move upwards, somewhere under the oil bed (17), at least one collecting place (9) is connected in direct or indirect connection to at least one discharge channel (11), said collecting place (9) comprising holes (10) provided in said discharge channel (11) or in an upwards directed drainage pipe (25) movably provided at said discharge channel (11), and through said discharge channel (11) the surrounding water (3) in the mixture/emulsion (2) is dischargeable from the container (5), as discharged water (13), via at least one existing lower discharge (14) located at the lower part (24) of the container (5), at the same time as the oil bed (17) is dischargeable at an upper part (12) of the container via at least one existing upper discharge (15) at the upper part (12) of the container, and wherein
   said collecting place (9) is at lowest arranged in height at a lower level (23) in the container (5), which is located in an area where the oil particles (16) have become so large and that the turbulence in the mixture/emulsion (2) has decreased so much that they start moving upwards, and
   said collecting place (9) is at highest located at an upper level (31) just below the oil bed (17), where the oil particles (16) not yet have been assimilated with the oil bed (17),
   whereby within a distance (7) between the lower and upper level (23,31) the position of said holes (10) is variable upwards and downward, so that an optimal separation of the water (3) from the oil (4) can take place at every moment and at different qualities of the oil (4) and densities of the water in the mixture/emulsion (2).

2. An oil, recover unit according to claim 1, characterized in that the pump (8) is connected to the inflow (6) and that at least one "bypass"-conduit (18) is connected along the pump (8), which can be opened and closed to varying degrees on demand by at least one first valve (19), whereby the mixture/emulsion can be fed backwards to a place upstream the pump (8) again, so that a pressure reliever in the lower part (24) at the inflow (6) on demand may can occur, to calm the inflow at the same time as the existing turbulence in the mixture/emulsion (2) can be reduced.

3. An oil recover unit according to claim 1, characterized in that
   the inflow (6) comprises a second valve (20),
   the lower discharge (14) comprises a third valve (21), and
   the upper discharge (15) comprises a fourth valve (22),
   whereby the second, third, and fourth valves can be opened and closed at varying degrees on demand, and
   whereby the second, third, and fourth valves can operate the process to retrieve the mixture/emulsion (2) and separate the water (3) from the oil (4), whereby the discharge of the oil bed (17) and the water (3) can take place in a desired extent and during a desired period of time and with a required level of purity that is going to be left in the discharged water (13) at the lower discharge (14), so that the discharged water (13) on demand can be pumped into the container (5) again for further separation of the oil (4) from the water (3).

4. A process for retrieval of a mixture/emulsion (2) and separation of water (3) from oil (4) using the oil recover unit (1) of claim 1 whereby the pump (8) is connected to the inflow (6) and the at least one "bypass"-conduit (18) is connected along the pump (8), which can be opened and closed to varying degrees on demand by at least one first valve (19), and the inflow (6) comprises a second valve (20), the lower discharge (14) comprises a third valve (21), and the upper discharge (15) comprises a fourth valve (22), characterized in that the process takes place in different stages, whereby in a first step the second valve (20) and the fourth valve (22) are opened at the same time as the first valve (19) and the third valve (21) is kept closed, the pump is started and the hose (29) soaks up parts of the mixture/emulsion (2), which thereafter under pressure is squeezed up into the container (5) until the same is filled to the upper discharge (15), in a second step the pump (8) is shut off during a desired period of time until a desired thickness of the oil bed (17) has been created, whereupon in a step three the discharged water (13) starts to fill the discharge channel (11) at the same time as the third valve (21) is opened for discharging the discharged water (13) via the lower discharge (14) and the pump (8) starts again to continuously keep the oil bed (17) in level with the upper discharge (15) and the fourth valve (22) being kept open for discharging the oil (4) from the oil bed (17) at the same time as it is continuously filled with new oil particles (16), and that in a fourth step the first valve (19) on demand is opened to decrease the turbulence, and that in a fifth step if the percentage of oil is higher than in a desired in the discharged water (13), the same is fed back to be soaked up again in the inflow (6), and that during the third to fifth steps all valves (19-22) at desired moments are put in to a desired position so that the oil recover steps all valves (19-22) at desired moments are put in to a desired position so that the oil recover unit (1) continuously and optimally can soak up the mixture/emulsion (2) and optimally be able to separate the water (3) from the oil (4).

\* \* \* \* \*